US011870824B1

(12) United States Patent
Singh et al.

(10) Patent No.: US 11,870,824 B1
(45) Date of Patent: Jan. 9, 2024

(54) CONTROL OF ACCESS TO RESTRICTED INFORMATION PRESENTED IN VIRTUAL MEETINGS

(71) Applicant: INTERNATIONAL BUSINESS MACHINES CORPORATION, Armonk, NY (US)

(72) Inventors: Hemant Singh, Gurgaon (IN); Sudarshan, Ghaziabad (IN); Anita Duggal, Delhi (IN); Deepak Malik, Gurgaon (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/064,310

(22) Filed: Dec. 12, 2022

(51) Int. Cl.
*H04L 65/401* (2022.01)
*H04L 9/40* (2022.01)
*H04L 12/18* (2006.01)

(52) U.S. Cl.
CPC ...... *H04L 65/4015* (2013.01); *H04L 12/1822* (2013.01); *H04L 63/105* (2013.01)

(58) Field of Classification Search
CPC ............ H04L 65/4015; H04L 12/1822; H04L 63/105
See application file for complete search history.

(56) References Cited

U.S. PATENT DOCUMENTS

| | | | |
|---|---|---|---|
| 6,684,212 B1 | 1/2004 | Day | |
| 8,965,975 B2 * | 2/2015 | Salesky | H04L 12/1813 709/204 |
| 9,407,621 B2 * | 8/2016 | Vakil | G06F 21/31 |
| 9,525,711 B2 * | 12/2016 | Ackerman | H04L 65/4015 |
| 9,654,450 B2 | 5/2017 | Ford | |
| 10,200,422 B1 * | 2/2019 | Jones | H04N 7/152 |

(Continued)

OTHER PUBLICATIONS

Method for Creating Sub-Group Private Speech Channel in Virtual Meeting Rooms, IP.com No. IPCOM000270861D, IP.com Electronic Publication Date: Sep. 2, 2022, 7 pages.

(Continued)

*Primary Examiner* — John A Follansbee
*Assistant Examiner* — Raqiul A Choudhury
(74) *Attorney, Agent, or Firm* — Schmeiser, Olsen & Watts, LLP; Stephanie Carusillo

(57) ABSTRACT

A method, computer program product, and computer system for controlling access to presentation content to present to multiple participants in a virtual meeting. The presentation content is received and includes restricted information. First participants who will be provided access to the presentation content during the virtual meeting, and second participants will be denied access to respective portions of the presentation content containing the restricted information during the virtual meeting, are identified. Entry by the first participants to a safe zone within the virtual meeting is provided. The presentation content is presented in the safe zone to the first participants during the virtual meeting. The restricted information is denied to the second participants during the virtual meeting. The first participants in the safe zone have full access to all content presented in the virtual meeting, outside the safe zone and not presented in any other safe zone within the virtual meeting.

20 Claims, 7 Drawing Sheets

(56) References Cited

U.S. PATENT DOCUMENTS

| | | | |
|---|---|---|---|
| 10,348,786 B1* | 7/2019 | Petit-Huguenin | ............................ H04L 65/4053 |
| 2014/0150059 A1* | 5/2014 | Uchida | ................... G06F 16/90 707/661 |
| 2017/0351476 A1* | 12/2017 | Yoakum | ................ G06F 3/0484 |
| 2018/0139413 A1 | 5/2018 | Diao | |

OTHER PUBLICATIONS

Holly Hronek, 5 New Unified Communications and Collaboration Features That Are Here to Stay, Retrieved from Internet on Nov. 30, 2022: https://www.unifysquare.com/blog/5%E2%80%AF-new-unified-communications-collaboration-features/, 13 pages.

By NewsBTC, 4 years ago, Beta Version of Content Exchange Platform, Retrieved from Internet on Nov. 30, 2022: https://www.newsbtc.com/all/blockchain-based-project-launches-beta-version-of-content-exchange-platform/, 25 pages.

Multipoint Control Unit (MCU), Retrieved from Internet on Nov. 30, 2022: https://videoconferencingsoft.com/multipoint-control-unit-mcu/, 11 pages.

One app for everything. And everyone. Calling, meetings, messaging, and events in the cloud for teams of all sizes, Retrieved from Internet on Dec. 7, 2022: https://www.webex.com/, 19 pages.

Trello, Trello brings all your tasks, teammates, and tools together, Retrieved from Internet on Dec. 7, 2022: https://trello.com/, 9 pages.

Mural, Mural, not just a meeting, Retrieved from Internet on Dec. 7, 2022: https://www.mural.co/?utm_medium=paid-search&utm_source=adwor, 8 pages.

* cited by examiner

CONTROL OF ACCESS TO RESTRICTED INFORMATION PRESENTED IN VIRTUAL MEETINGS

BACKGROUND

The present invention relates in general to communication of information in virtual meetings, and in particular to control of access to restricted information presented in virtual meetings.

There is a need to improve control of access to restricted information presented in virtual meetings.

SUMMARY

Embodiments of the present invention provide a method, a computer program product and a computer system for controlling access to presentation content to be presented to a plurality of participants in a virtual meeting.

One or more processors receive the presentation content. The presentation content includes restricted information pertaining to one topic and has a security level with respect to the one topic.

After the presentation content is received, the one or more processors identify one or more first participants of the plurality of participants in the virtual meeting who will be provided access to the presentation content during the virtual meeting and one or more second participants of the plurality of participants in the virtual meeting who will be denied access to one or more portions of the presentation content containing one or more portions of the restricted information during the virtual meeting. The identifying is based on access factors including: (i) a security level of the one topic and (ii) a security clearance level of each participant of the plurality of participants with respect to the one topic.

In response to the identifying of the one or more first participants and the one or more second participants, the one or more processors provide entry by the one or more first participants to a safe zone within the virtual meeting. The presentation content is presented in the safe zone to the one or more first participants during the virtual meeting. The one or more portions of the presentation content containing the restricted information is denied to the one or more second participants during the virtual meeting. The one or more first participants in the safe zone have full access to all content presented in the virtual meeting and not presented in any other safe zone within the virtual meeting.

DETAILED DESCRIPTION

Figure 1:
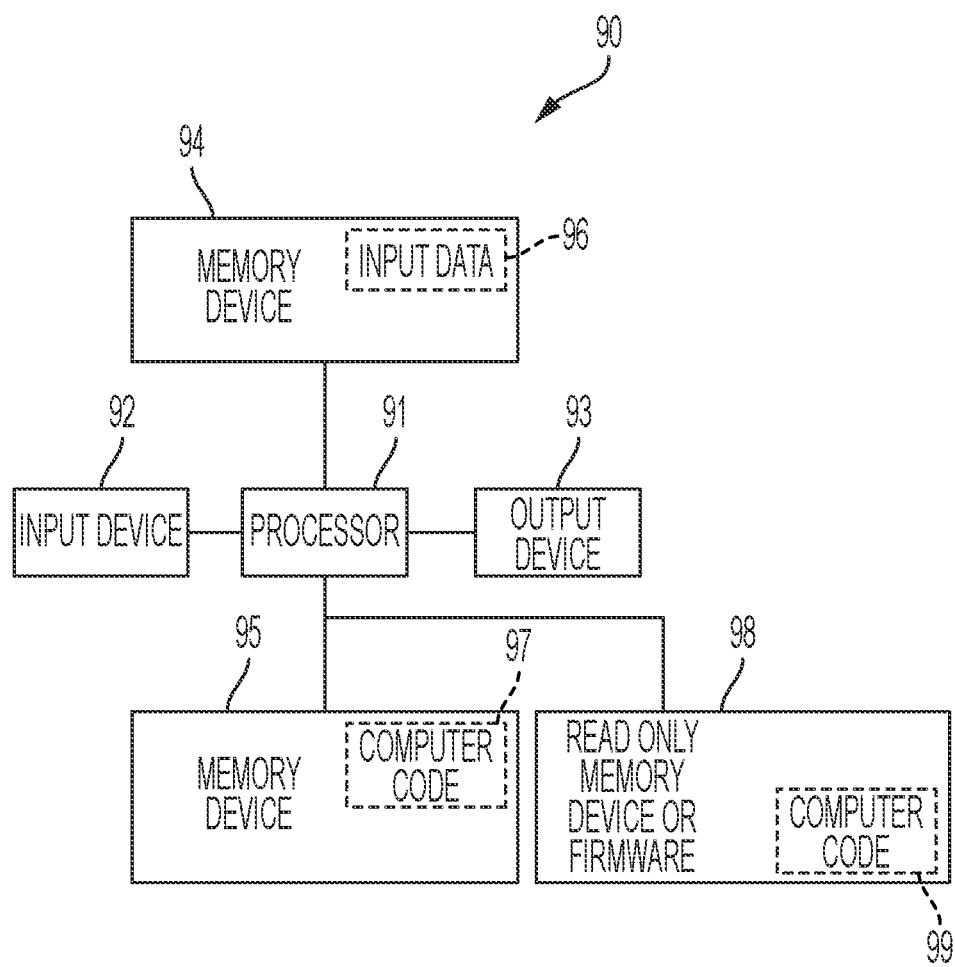
FIG. 1 illustrates a computer system, in accordance with embodiments of the present invention.

Since the COVID pandemic broke out in early 2020, virtual meetings have become commonplace.

In a virtual meeting, participants (i.e., individuals and/or groups of individuals) meet online (e.g., over the Internet). Virtual meetings enable participants to share information and data in real-time, discuss topics and/or make decisions, without being physically located together.

Virtual meetings may use video teleconferencing software, such as Zoom®, Webex®, Microsoft Teams®, etc.

In a virtual meeting, participants can interact over video calls, do team meetings, and share screens to display and communicate files, data, graphics, etc. and a presenter in the virtual meeting can choose to bring up a screen of any participant who desires to share the participant's screen with other participants.

A difficulty in current virtual meetings is that the participants have to be careful not to share confidential information with participants who are not entitled to have access to the confidential information. Thus, extensive prior preparation for the virtual meeting may be required for filtering and/or suppressing the confidential information.

Access of confidential information may be restricted (i.e., confidential information may be selectively available to some participants, and selectively denied to other participants, in the virtual meeting).

The words "confidential" and "restricted" have the same meaning with respect to (i) information or content that is confidential and (ii) information or content that is restricted.

During a virtual meeting, a group of the participants may desire to work in a "breakout area" in which information is not shared with the remaining participants of the virtual meeting. The breakout area, which is outside of the virtual meeting, suppresses any communication or exchange of information with the remaining participants of the virtual meeting.

A disadvantage of the breakout area is that the group is unable to satisfy the group's need to listen to and respond to conversation occurring in one or more virtual spaces in the full virtual meeting but outside the breakout area.

For example, Webex® enables participants to go to different breakout areas. However, the participants in the different breakout areas are unable to obtain information being presented in other breakout areas or in the full virtual meeting.

The present invention overcomes the preceding disadvantages by implementing restricted sharing of information (i.e., audio and/or visual information), which includes selectively and dynamically permitting access to presentation content to some participants while denying access to the presentation content to other participants, while all participants remain in the full virtual meeting and do not go to breakout areas.

The present invention instantiates an intelligent workflow to allow virtual meeting participants from several entities or organizations to collaboratively work virtually on some topic (e.g., to create new products). During the virtual meeting, some participants will work in a group in a "safe zone" while still being connected to the remaining participants in the virtual meeting, except for other participants in other groups who are working in other safe zones. Also, participants from different organizations may share information that may be restricted by an organization's information security policy. This information will be shared between participants from one organization but will be restricted (i.e., unavailable) to participants from other organizations. Such information in the content or conversation is exchanged in a single virtual meeting. Thus in one embodiment, exchange of restricted information between allowed participants is permitted, while the exchange of restricted information between participants across different organizations is disallowed.

The present invention uses a group conversation management unit that uses control plane information from the virtual Master Control Unit (MCU) to determine the restriction levels of topics which are based on settings by a meeting host ("host"). The meeting host is computer code configured to control aspects of the virtual meeting and to receive input and other needed information from a host participant in the virtual meeting. A host participant is an individual participant in the virtual meeting who communicates with the host.

Audio and visual content is analyzed and a description of the audio and visual content is generated. A content analytic engine, which has the applicable information security policies across participating organizations, applies information security rules on the content description and determines the content that has to be restricted. A content regeneration engine uses the restriction input to rebuild visual and/or audio information for distribution to different participant groups as defined by the host in one embodiment. In one embodiment, some participants may form a group to tackle a task and may want to keep the conversation restricted to the participants within the group while still being exposed to information being presented in the full virtual meeting.

In one embodiment, the host can divide participants into one or more groups based on the role of the participants (i.e., the role of individuals and/or the role of an organization) and/or based on a need of the participants to obtain specific type of information. Thus, the information will be delivered to different participants, and/or sets of participants, as per the settings established by the host. The audio and/or visual information will be stored and filtered and then broadcast to specific participants without sending the specific participants to breakout rooms, which will result in highly secured communication of information. In one implementation, communication and/or exchange of information may be delayed in time by several seconds, but other implementations will occur in real time with sufficiently small delay of time that is transparent to the participants.

In one embodiment, participants from different organizations are permitted to join virtual meetings while information communication restrictions are controlled.

In one embodiment, dynamic groups of participants are formed, wherein the formed groups are not in breakout rooms and are part of the activity of the full virtual meeting.

In one embodiment, different participants can form or dissolve groups from the participants in the virtual meeting for participating in unrestricted communication during the virtual meeting with applicable information restriction(s) pertinent to the groups.

In one embodiment, shared content is filtered to adhere to defined policies to avoid confidential information from being inadvertently communicated to participants who should not have access to the shared content.

In one embodiment, watermarking or shading of confidential information is used to deny access to the confidential information by one or more participants who should not have access to the confidential information.

In one embodiment, screen blurring may be used to disable clarity of visibility of a display screen used, in the virtual meeting, to display confidential information to one or more participants who should not have access to the confidential information.

In one embodiment, a collaboration index value can be used to measure an extent to which collaborative content can be shared with different participants in the virtual meeting.

In one embodiment, sharing of information is on a single display screen in a single screensharing mode.

In one embodiment, sharing of information is on multiple display screens in a multiple screensharing mode.

In one embodiment, the host is enabled to select either the single screensharing mode or the multiple screensharing mode for use in the virtual meeting. Once the host enables use of the multiple screensharing mode, screens of all participants who choose to share their screen may share their screen concurrently.

In one embodiment, participants will have an option to choose a layout for display of information on a display screen for an improved viewing experience.

Different portions of content (for example a document) can have different levels of classification. Therefore, permission of participants (i.e., individuals or groups of individuals) to view or listen to different portions of a document may vary with a security clearance level of each participant for each portion of the content having a different level of classification. In other words, different individuals or groups can view, listen to, or be exposed to different portions of the content.

When content is being presented dynamically in real time in the virtual meeting, all portions of the content to be presented must be screened before any of the content could be seen by any of the participants.

If a new group or a new individual enters the virtual meeting, that new group or new individual must be assessed as to whether the new group or new individual should be permitted access to the content that is currently being presented in the virtual meeting.

In one embodiment, the host sets up the meeting, including identifying different organizations that participants belong to. The information security policies of these organizations are inputted into the system. One or more information security policies of these organizations may be available from prior meetings. The MCU constructs the filtering rules and the applicability of the different policies to different participant groups.

As participants join the virtual meeting, the participants are made aware of policies that define the boundaries of restricted information for the participants. The policies can also be set up at the start of the virtual meeting.

As participants share content during the virtual meeting, the MCU may apply the policies for each time segment of the virtual meeting and may share the filtered content across the communication channels to the participants.

In one embodiment, a group of participants in the virtual meeting could decide to move to a private space, called a "safe zone", and can set the rule restrictions such as being able to obtain content from the full virtual meeting but not sending back information being shared in the safe zone.

Similarly, one or more other groups of participants in the virtual meeting could decide to move to a respective other time zone.

The information policies define boundaries for restricting information that is outside the boundaries. The boundaries are applied to the content and portions of the content that are within the boundaries may be shared.

When content is shared, if the content is from direct human input (e.g., from voice such as speech to text or through drawings) or if the content is copied from a web browser or from another document, then the source of the content is provided to the MCU that logs the content (e.g., in a blockchain) for source audit/attribution purposes, since multiple enterprises may be involved collaboratively (e.g., in a scenario of new content development).

As an example, a product development call is planned. The call is a virtual meeting. In the call, the discussion includes development of the various features. Multiple people are invited to the call. In the call, the plan is to share high-level requirements with the people on the call, which may include confidential design diagrams that should not be shared with a vendor. However, the vendor is required to be in the call to discuss the high-level requirements.

One proposed solution to the preceding example is to have two separate meetings (one meeting with the product engineer and another meeting without the vendor). However, such a solution would be risky, because if all stakeholders are not part of the full virtual meeting, there is a chance of gaps in understanding the high-level requirements.

Another proposed solution to the preceding example is that for any confidential discussion, participants can move to the breakout area. However, if few people move to the breakout area, some significant part of the discussion may be missed by the participants who have moved the breakout area.

A practical solution to the preceding example in accordance with the present invention is that all participants/stakeholders will be part of the same call. When there is anything confidential being presented or discussed, which a specific participant or participants should not be able to access (i.e., hear or see), the system will create a "safe zone" based on the information security policy, where people inside the safe zone can see or hear everything being discussed on the call, but people outside the safe zone will not be able to see or hear the parts of conversations that occur in the safe zone.

FIG. 1 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 1 shows the computer system 90 as a particular configuration of hardware and software, any configuration of hardware and software, as would be known to a person of ordinary skill in the art, may be utilized for the purposes stated supra in conjunction with the particular computer system 90 of FIG. 1. For example, the memory devices 94 and 95 may be portions of a single memory device rather than separate memory devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

A computer program product of the present invention comprises one or more computer readable hardware storage devices having computer readable program code stored therein, said program code containing instructions executable by one or more processors of a computer system to implement the methods of the present invention. In one embodiment, the one or more processors are general-purpose processors such as, inter alia, a Central Processing Unit (CPU).

A computer system of the present invention comprises one or more processors, one or more memories, and one or more computer readable hardware storage devices. In one embodiment, the one or more processors are general-purpose processors such as, inter alia, a Central Processing Unit (CPU), wherein the one or more hardware storage devices contain program code executable by the one or more processors via the one or more memories to implement the methods of the present invention. In one embodiment, the one or more processors are special-purpose processors such as, inter alia, an Application-Specific Integrated Circuit (ASIC).

Figure 2:
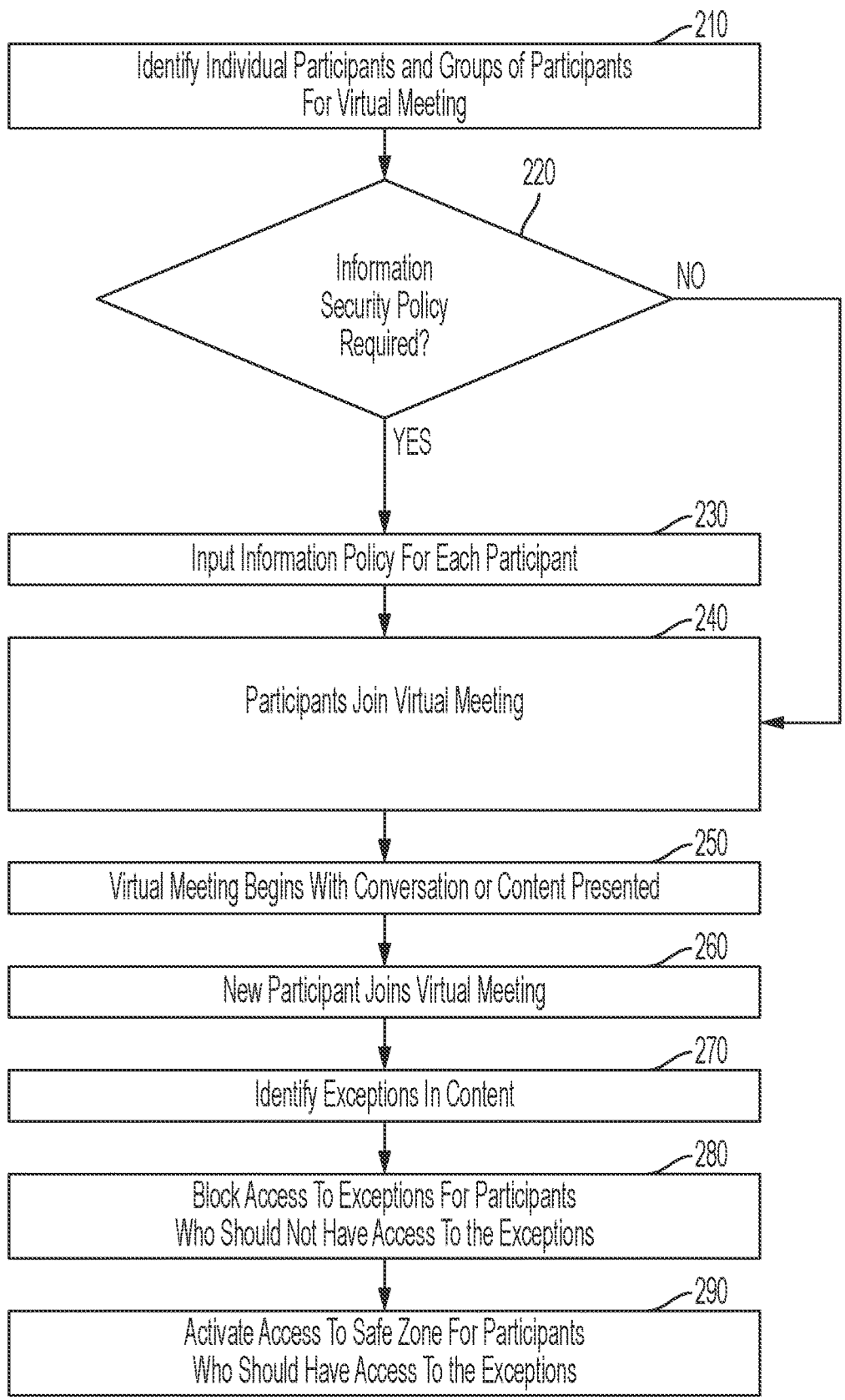
FIG. 2 is a flow chart describing a method in which a safe zone is provided for participants in a virtual meeting to selectively control access to information presented in the virtual meeting, in accordance with embodiments of the present invention.

FIG. 2 is a flow chart describing a method in which a safe zone is provided for participants in a virtual meeting to selectively control access to information presented in the virtual meeting, in accordance with embodiments of the present invention. The method in FIG. 2 is applicable to the preceding example. FIG. 2 includes steps 210-290.

In step 210, a host identifies, for the virtual meeting, participants including one or more individual participants and/or one or more groups of participants (e.g., across organizations). In one embodiment, at least one of the individual participants in the virtual meeting do not belong to any of the groups of participants.

In step 220, the host decides whether an information security policy for each group is required.

If the host decides that the information security policy for each group is required (YES branch from step 220), then in step 230 the host inputs an information security policy for each group based on guidelines by an organization to which the group belongs or is associated with.

If the host decides that the information security policy for each group is not required (NO branch from step 220), then step 240 is next executed.

In step 240, the participants join the virtual meeting.

In step 250, the virtual meeting begins with conversation involving content and/or presentation of the content.

In step 260, a new participant joins the virtual meeting. In one embodiment, guidelines for the new participant are updated.

In step 270, before the content is shared and/or discussed by one or more participants of one organization, the system reviews the shared and/or discussed content and identifies parts of the content that are exceptions (i.e., confidential) to the information exchange.

In step 280, in response to exception content being reviewed, the system displays an alarm on a display screen accessible to the host and blocks access to the exceptions for some or all participants from other organizations in the virtual meeting, and blocks access to the exceptions for individuals in the virtual meeting who should not have access to the exceptions. The blocking of access may include blocking sound and/or screen display of such exception content.

In step 290, the host activates, based on the information security policy, access to a "safe zone" for participants in the one organization who should have access to the exceptions and provides the participants in the one organization in the safe zone access to the full virtual meeting, while preventing the participants in the other organizations from having access to the exceptions.

Figure 3:
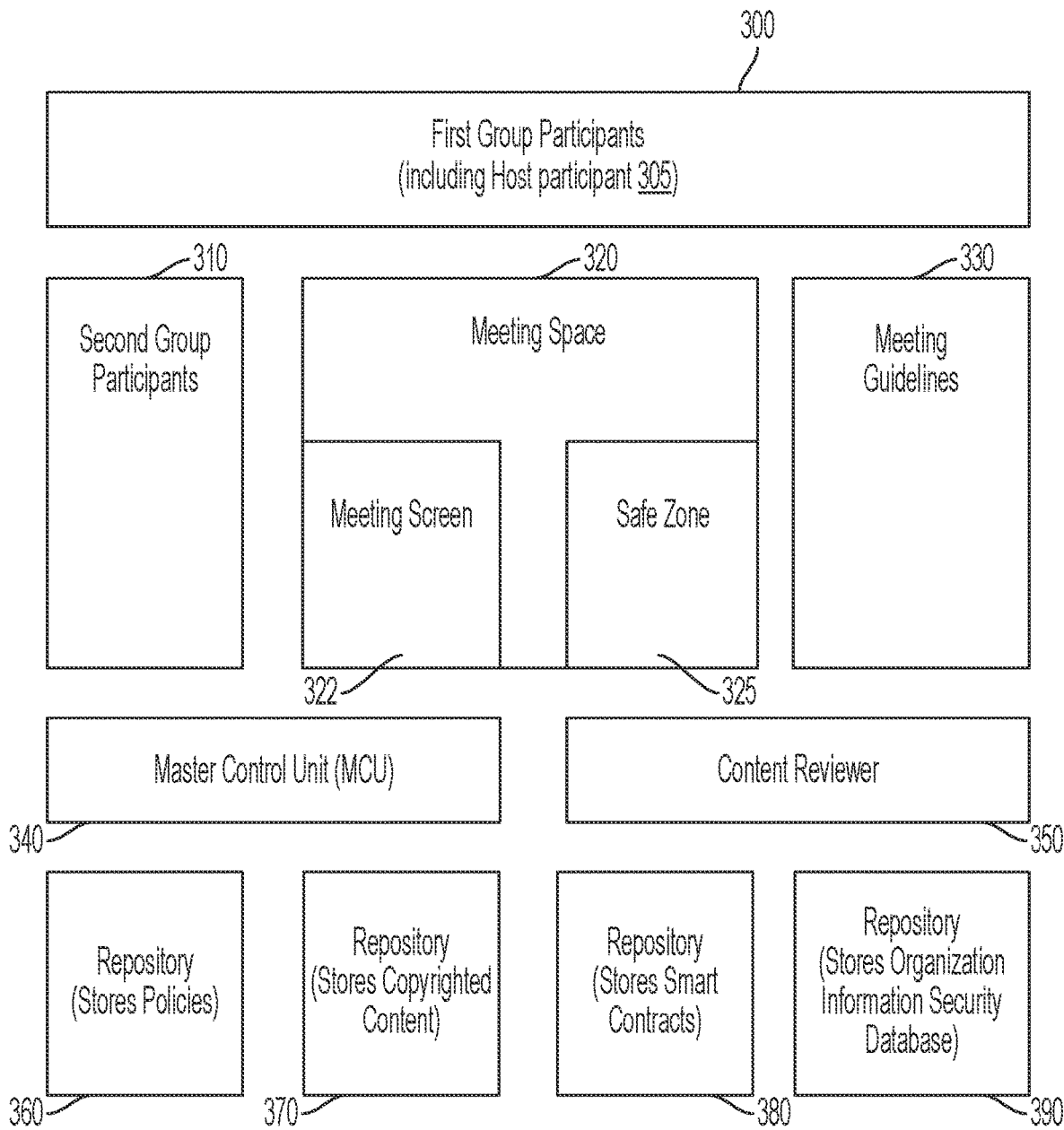
FIG. 3 is a system diagram illustrating a scenario of a virtual meeting with two participant groups, in accordance with embodiments of the present invention.

FIG. 3 is a system diagram illustrating a scenario of a virtual meeting with two participant groups, in accordance with embodiments of the present invention.

The system in FIG. 3 includes: first group participants 300 including host participant 305, second group participants 310, a meeting space 320, meeting guidelines 330, Master Control Unit (MCU) 340, content reviewer 350, policy repository 360, copyrighted content repository 370, smart contracts repository 380, and organization information security database 390.

The host participant 305 is a participant who communicates with the host (i.e., with the program code of the host).

The first group participants 300 and the second group participants 310 are groups from different organizations who are participating in the virtual meeting to share their files to resolve an issue.

The meeting space 320 includes a meeting screen 322 and a safe zone 325.

The host (i.e., program code of the host) initiates and organizes the virtual meeting, with assistance from host participant 305. The host receives input and other needed information from the host participant 305. The host also invites the second group participants 310 to the virtual meeting. The host additionally uploads policies from the first group participants 300 and the second group participants 310 into the policy repository 360.

The host, who initiates the virtual meeting, defines the boundaries for the virtual meeting, identifies the participants, identifies the applicable meeting guidelines 330 to link to the first group 300 organization information security policy with the second group 310 organization's guidance which may be uploaded by the host or by individuals belonging to the second group 310, and identifies the group level aggregation of content that can be shared or not, which determines the boundaries and pathways for the content flow in real time at the virtual meeting.

The Master Control Unit (MCU) 340 validates and/or filters the content to be presented in the virtual meeting based on the information security policy.

Policy repository 360, which stores policies, is a repository where participants from other entities/organizations/units submit any policies and policy guidelines in a secure fashion.

Repository 370, which stores copyrighted content, is a store for both new content and existing content from external sources or across entities if the existing content is developed using the initial provider of the copyrighted content.

Repository 380 stores smart contracts. Between the participating entities for the smart contracts, information sharing rules and authorship rules for new content developed are set up as necessary for use during the meetings based on the context of the smart contracts if the new content is discussed/developed.

Repository 390, which is an organization information security database, is a store of the organization's information security policies, guidelines, responsibilities matrix, clearance levels, etc.

Reviewed and authorized content is shared in the virtual meeting in real time on the meeting screen 322 within the meeting space 320. The reviewed and authorized content is sent across channels by the Master Control Unit (MCU) 340 to the first group participants 300 and the second group participants 310.

The content reviewer 350 reviews all content shared between participants in the virtual meeting (e.g., video, audio, text/pictorial content). In one embodiment, the content is reviewed by the content reviewer 350 before initiation of the virtual meeting. In another embodiment, the content is reviewed by the content reviewer 350 in real time during the virtual meeting as the content is ready to be presented in the virtual meeting. The content reviewer 350 creates a text description for video/images, converts speech to text, and submits the content to an artificial intelligence (AI) engine.

The meeting guidelines 330 provide the links/information security rules to be applied to the content being reviewed, wherein links are expanded to obtain relevant information from repository 360 which stores policies and repository 390 which is an organization information security database.

Once any content to be hidden is identified based on the policies/rules, the content to be hidden is prevented from being accessible to meeting participants not authorized to have access to the content by hiding/masking one or more portions of the content. Natural Language Processing (NLP) and/or Natural Language Understanding (NLU), together with a grammar unit, verifies if the text has a logical continuity when parts of the text content are to be hidden. The output of content to be hidden is sent to the MCU 340. If any content to be hidden is marked/determined as new, such content is verified with smart contracts for ownership amongst the participating entities and then stored as new content in repository 370. If there is reference to other existing copyrights/sources when content is developed, such content is stored in a smart contract repository 380 for auditability.

The meeting guidelines 330 describe the content sharing boundaries and sharing paths. When reviewed content is received by the MCU 340 from the content reviewer 350, the rules regarding the boundaries and paths are applied and the video/audio content is sent to the appropriate channels. There are underlying standards-based protocols to achieve transmission of parts of content in different channels.

The first group participants 300 enter the safe zone 325 to discuss content (e.g., a client contract) that is not accessible to the second group participants 310. In the safe zone 325, the first group participants 300 select the appropriate contract content that is allowed by the information security policy. Once the client contract is fully edited to include only allowed contract content, the MCU shows the edited contract to all of the participants in the meeting space 320 (e.g., on the meeting screen 322), including to the second group participants 310, since the edited contract has cleared the information security policy.

Figure 4:
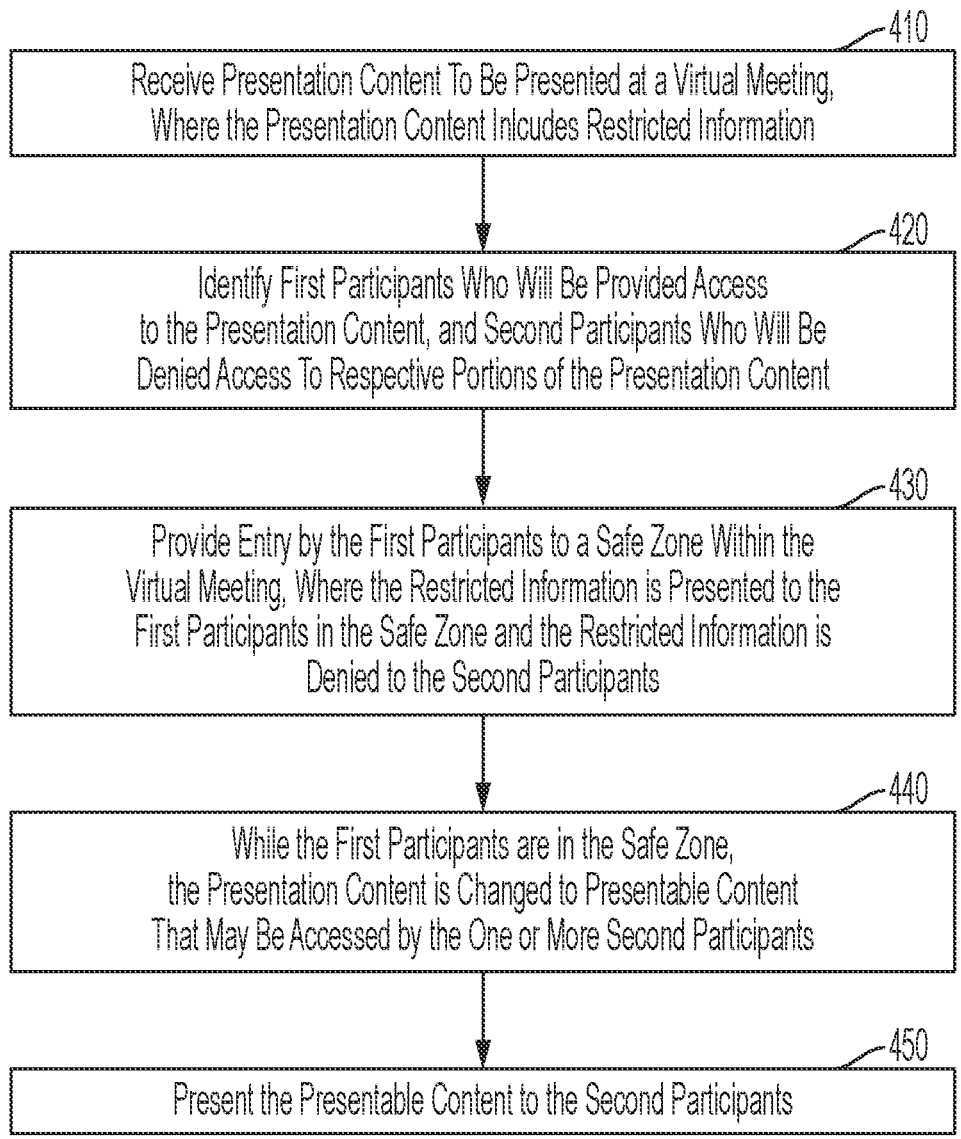
FIG. 4 is a flow chart describing a method for selectively controlling access to content presented in a virtual meeting, in accordance with embodiments of the present invention.

FIG. 4 is a flow chart describing a method for selectively controlling access to content presented to a plurality of participants in a virtual meeting, in accordance with embodiments of the present invention. FIG. 4 includes steps 410-450.

In step 410, the presentation content is received, wherein the presentation content includes restricted information pertaining to one topic and has a security level with respect to the one topic. In one embodiment, the presentation content is received (e.g., by the host) via one or more processors from a participant presenter (i.e., the participant who is to present the presentation content).

In one embodiment, the presentation content is received before the virtual meeting begins.

In one embodiment, the presentation content is received after the virtual meeting begins and during the virtual meeting. In this embodiment, the identifying step 420 is performed in real time in a manner that is transparent to the plurality of participants.

The restricted information within the presentation content may be visual information, audio information, and combinations thereof.

The restricted visual information may be, inter alia, video information, text information, graphics information, or combinations thereof.

The restricted audio information may be, inter alia, speech, music, or combinations thereof.

After the presentation content is received in step 410, step 420 identifies one or more first participants of the plurality of participants in the virtual meeting who will be provided access to the presentation content during the virtual meeting and one or more second participants of the plurality of participants in the virtual meeting who will be denied access to respective one or more portions of the presentation content containing one or more portions of the restricted information during the virtual meeting.

The individuals in a group are members of an organization such as, inter alia, a company, a social organization, a professional organization, a labor union, a governmental organization, etc.

The participants at the virtual meeting may include individuals, groups of individuals, or combinations thereof.

The identifying of the one or more first participants and of the one or more second participants is based on access factors including: (i) a security level of the one topic and (ii) a security clearance level of each participant of the plurality of participants with respect to the one topic.

In one embodiment, the access factors further include: (iii) selectivity with respect to an audio and/or visual medium in which the one topic is presented in the virtual meeting. Thus in this embodiment, denying access to restricted information may include denying access: to audio content but not to visual content, to visual content but not to audio content, or to both audio content and visual content.

The security level of the one topic may be obtained from use of an information security policy.

The information security policy may have originated from any source (e.g., a governmental source).

In one embodiment in which the presentation content is from a group of individuals attending the virtual meeting, the information security policy may have originated from an organization to which the individuals in the group belong. In another embodiment, the information security policy may have originated from a source other than the organization.

The information security policy provides rules used to identify a security level of each topic of multiple topics. For example, the topic may be a software program and a rule may be that the security level of the software program is determined by a formula involving an average quantity of computational and storage resources that has been utilized previously when the software program was executed.

In one embodiment, rules in the information security policy may deny access to information presented on a specified medium (e.g., an audio and/or visual medium in which the one topic is presented in the virtual meeting). Thus in this embodiment, access to the one topic may be denied if the information regarding the one topic is presented in an audio medium, in a visual medium, or in both an audio medium and a visual medium. Thus, rules regarding access to information presented in the virtual meeting may be selective to the medium or media used to present the information.

Information presented in a visual medium may include, inter alia, video information, text information, graphics information, or combinations thereof.

Information presented in an audio medium may include, inter alia, speech, music, or combinations thereof.

The topic to which the restricted information pertains may be determined from analysis of the presentation content, using Natural Language Processing (NLP) and/or Natural Language Understanding (NLU) together with artificial intelligence (AI). NLU is a subtopic of natural-language processing using an artificial intelligence pertaining to machine reading comprehension.

The NLP and/or NLU may be used to analyze the presentation content to identify the restricted content and one or more topics associated with the restricted content. However, before the NLP and/or NLU can be used to analyze the presentation content, the NLP and/or NLU needs to be trained by the AI for identifying restricted information and associated topics. The training uses multiple information samples containing restricted information.

Denying access by the one or more second participants to one topic in the presentation content is based on access factors that includes a security level of the one topic and a security clearance level of each participant with respect to the one topic.

The preceding discussion explained how a security level of the one topic may be determined.

A security clearance level of each participant with respect to the one topic may be set, inter alia, by the participant presenter (i.e., the participant who is to present the presentation content) or by an organization to which the participant presenter belongs (if the participant presenter is a member of the organization).

Consider the following example for ascertaining whether to allow or deny access to presentation content by a participant in a virtual meeting.

A virtual meeting is held by an organization to decide whether to use a new fuel as an energy source for performing operations on machines that are used to perform a particular process for the organization. The virtual meeting is attended by members of the organization who know and understand the process and by three experts (experts A, B and C) on the new fuel who are not members of the organization.

The participant presenter is a member of the organization, and a pertinent topic in the presentation content for this example is: energy requirements to support the process. This topic may have a security level of 1, 2 or 3, and each participant may have a security clearance level of 1, 2 or 3. The organization sets the security level of the topic and also sets the security clearance level of each participant in the virtual meeting.

A security level of 1 for the topic is a higher level of security than a security level of 2, and a security level of 2 for the topic is a higher level of security than a security level of 3. Thus, a security level of 1 for the topic restricts access to the topic more than a security level of 2, and a security level of 2 for the topic restricts access to the topic more than a security level of 3.

In this example, the topic has a security level of 2. Thus, a participant having a security clearance level of 1 or 2 will be allowed access to the presentation content pertaining to the topic, and a participant having a security clearance level of 3 will be denied access to the presentation content pertaining to the topic.

The participants who are members of the organization each have a security clearance level of 1 or 2 and are therefore allowed access to the presentation content pertaining to the topic.

Experts A has been assigned a security clearance level of 2 by the organization and is thus allowed to have access to the presentation content pertaining to the topic.

Experts B and C have been assigned a security clearance level of 3 by the organization and are thus denied access to the presentation content pertaining to the topic.

Returning to FIG. 4, in response to the identifying of the first and second participants in step 420, step 430 provides entry by the one or more first participants to a safe zone within the virtual meeting. The presentation content is presented in the safe zone to the one or more first participants during the virtual meeting and the one or more portions of the presentation content containing the restricted information is denied to the one or more second participants during the virtual meeting. The one or more first participants in the safe zone have full access to all content presented in the virtual meeting and not presented in any other safe zone within the virtual meeting.

The safe zone is a computer-simulated environment within the virtual meting. The safe zone is characterized by control of information sent and received by the individuals (i.e., the one or more first participants in the scenario of FIG. 4) who are in the safe zone.

The denied presentation content may be visual information, audio information, and combinations thereof.

The denied visual information may include, inter alia, video information, text information, graphics information, or combinations thereof.

The denied audio information may include, inter alia, speech, music, or combinations thereof.

During a period of time in which the one or more participants are in the safe zone, step 440 changes the presentation content to presentable content that may be accessed by the one or more second participants.

Step 450 presents the presentable content to one or more second participants.

Figure 5:
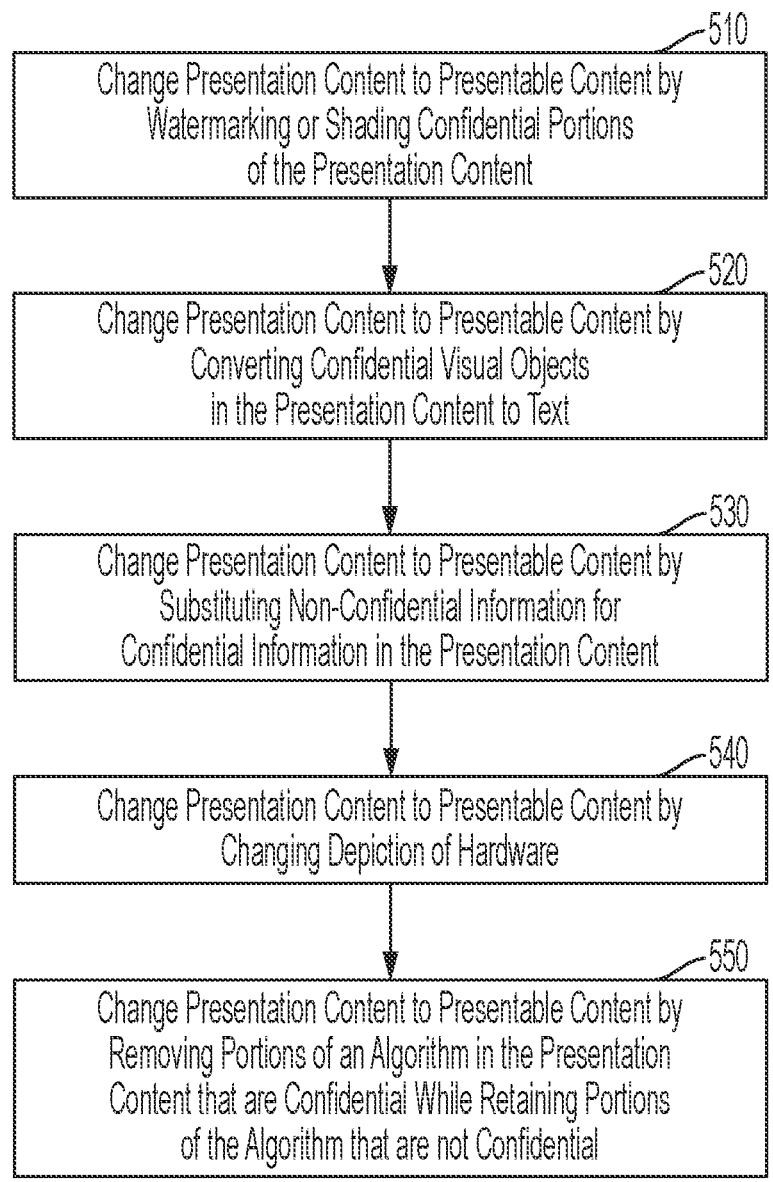
FIG. 5 depicts steps that may be performed to change presentation content to presentable content, in accordance with embodiments of the present invention.

FIG. 5 depicts steps 510-550 that may be performed to change presentation content to presentable content, in accordance with embodiments of the present invention. It is not required to perform all steps of steps 510-550. Rather, one or more steps of steps 510-550 are performed to change the presentation content to the presentable content. The one or more steps of steps 510-550 may be executed in any sequential order to change the presentation content to the presentable content.

In one embodiment, step 510 changes the presentation content to presentable content by watermarking or shading the confidential portions of the presentation content.

In one embodiment, step 520 changes the presentation content to presentable content by converting confidential visual objects in the presentation content to text in a manner that does not disclose confidential visual aspects of the visual objects.

In one embodiment, step 530 changes the presentation content to presentable content by substituting non-confidential information for confidential information in the presentation content. For example, confidential numbers may be replaced by non-confidential numbers.

In one embodiment, step 540 changes the presentation content to presentable content by changing a depiction of hardware. For example, although the internals of a machine may be confidential relative to a group and cannot be shown to the group, external blocks or parts of the machine may not classified and could be shown to the one or more second participants who cannot see the internals (e.g., gears wires nuts bolts etc.) of the machine.

In one embodiment, step 550 changes the presentation content to presentable content by removing portions of an algorithm in the presentation content that are confidential while retaining portions of the algorithm that are not confidential. For example, the internal portions of the algorithm may be confidential, and the input and output of the algorithm may not be confidential. Thus, the algorithm may be changed by removing the internal portions of the algorithm and making the input and output of the algorithm accessible to the one or more second participants.

Figure 6:
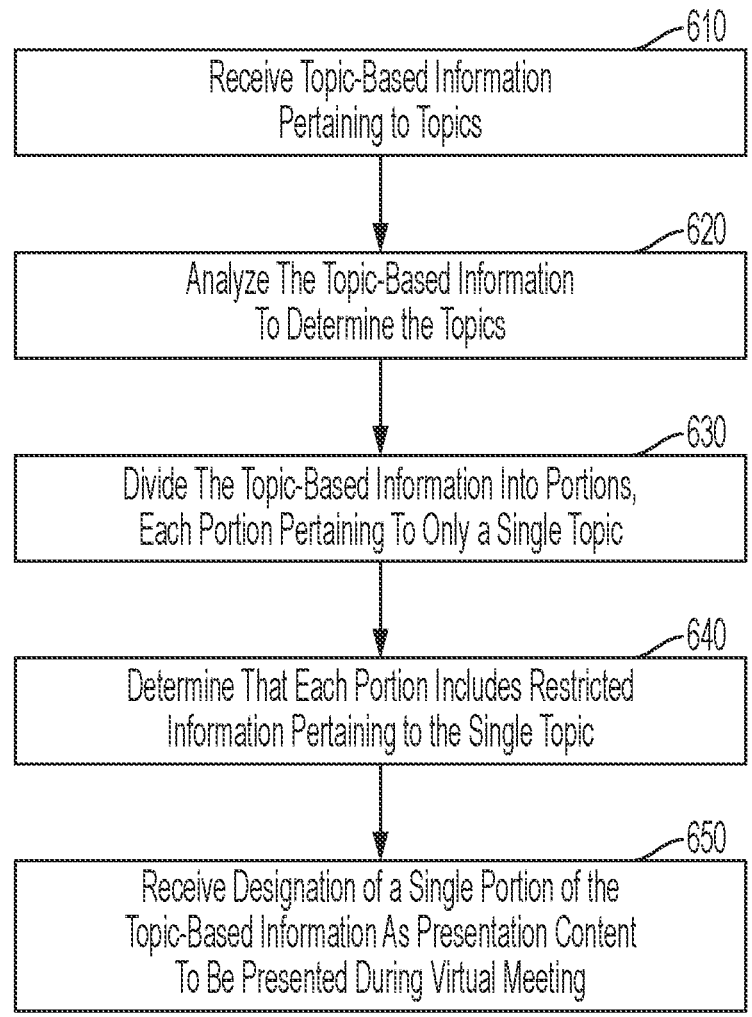
FIG. 6 is a flow chart describing a method for determining content to be presented in a virtual meeting, in accordance with embodiments of the present invention.

FIG. 6 is a flow chart describing a method for determining content to be presented in the virtual meeting, in accordance with embodiments of the present invention. FIG. 6 includes steps 610-650.

Step 610 receives topic-based information pertaining to a plurality of topics therein.

Step 620 analyzes the topic-based information to determine the topics in the topic-based information.

Step 630 divides the topic-based information into a plurality portions, wherein each portion of the topic-based information independently pertains to only a single topic of the plurality of topics.

Step 640 determines that each portion of one or more portions of the plurality of portions include restricted information pertaining to the single topic therein.

Step 650 receives a designation of a single portion of the one or more portions of the topic-based information as the presentation content to be presented during the virtual meeting, wherein the restricted information pertaining to the one topic is the restricted information pertaining to the single topic in the single portion. In one embodiment, the designation of the single portion is received from the host or from a participant in the virtual meeting.

A "processor" herein may be either a general-purpose processor such as, inter alia, a Central Processing Unit (CPU) or a special-purpose processor such as, inter alia, an Application-Specific Integrated Circuit (ASIC). The general-purpose processor (e.g., CPU) and the special-purpose processor (e.g., ASIC) are each a hardware component, namely a chip, within the computer system of the present invention.

The general-purpose processor (e.g., CPU) used for the present invention is a chip configured to execute program code that is software stored in one or computer readable hardware storage devices located external to the general-purpose processor. The program code, upon being executed by the general-purpose processor, performs embodiments of the present invention but is also configured to execute a large variety of other software unrelated to the present invention.

The special-purpose processor (e.g., ASIC) used for the present invention is a chip customized for a particular use, namely for executing embodiments of the present invention. All of the algorithms of the present invention are incorporated within the circuitry and logic of the special-purpose processor. Thus, the electrical circuitry within the special-purpose processor is hard wired to perform the embodiments of the present invention. The special-purpose processor is not capable of general-purpose usage and thus can be used only for executing embodiments of the present invention.

The special-purpose processor (e.g., ASIC) provides the following improvements for the functioning of the computer of the computer of the computer system as compared with the general-purpose processor (e.g., CPU).

As a first improvement provided by the special-purpose processor, the special-purpose processor consumes less power than the general-purpose processor.

As a second improvement provided by the special-purpose processor, the special-purpose processor executes algorithms of the present invention faster (i.e., at a higher execution speed) than does the general-purpose processor for the following reasons. First, the special-purpose processor is specific to the embodiments of the present invention and is designed in hardware to optimize speed of execution of embodiments of the present invention. Second, the execution logic of the embodiments of the present invention is incorporated within the logic and circuitry of the special-purpose processor. In contrast, each executable instruction of the program code, which is stored in computer readable storage external to the general-purpose processor, is accessed from the external storage by the general-purpose processor before being executed by the general-purpose processor, which is a time cost not experienced by the special-purpose processor.

As a third improvement provided by the special-purpose processor, the special-purpose processor is smaller in size than the general-purpose processor and thus occupies less space than the general-purpose processor.

As a fourth improvement provided by the special-purpose processor, the special-purpose processor avoids having to store program code that would be executed by the general-purpose processor and thus saves data storage space.

As a fifth improvement provided by the special-purpose processor, the special-purpose processor involves usage of fewer hardware parts than does the general-purpose processor and is therefore less prone to hardware failure and is accordingly more reliable.

Figure 7:
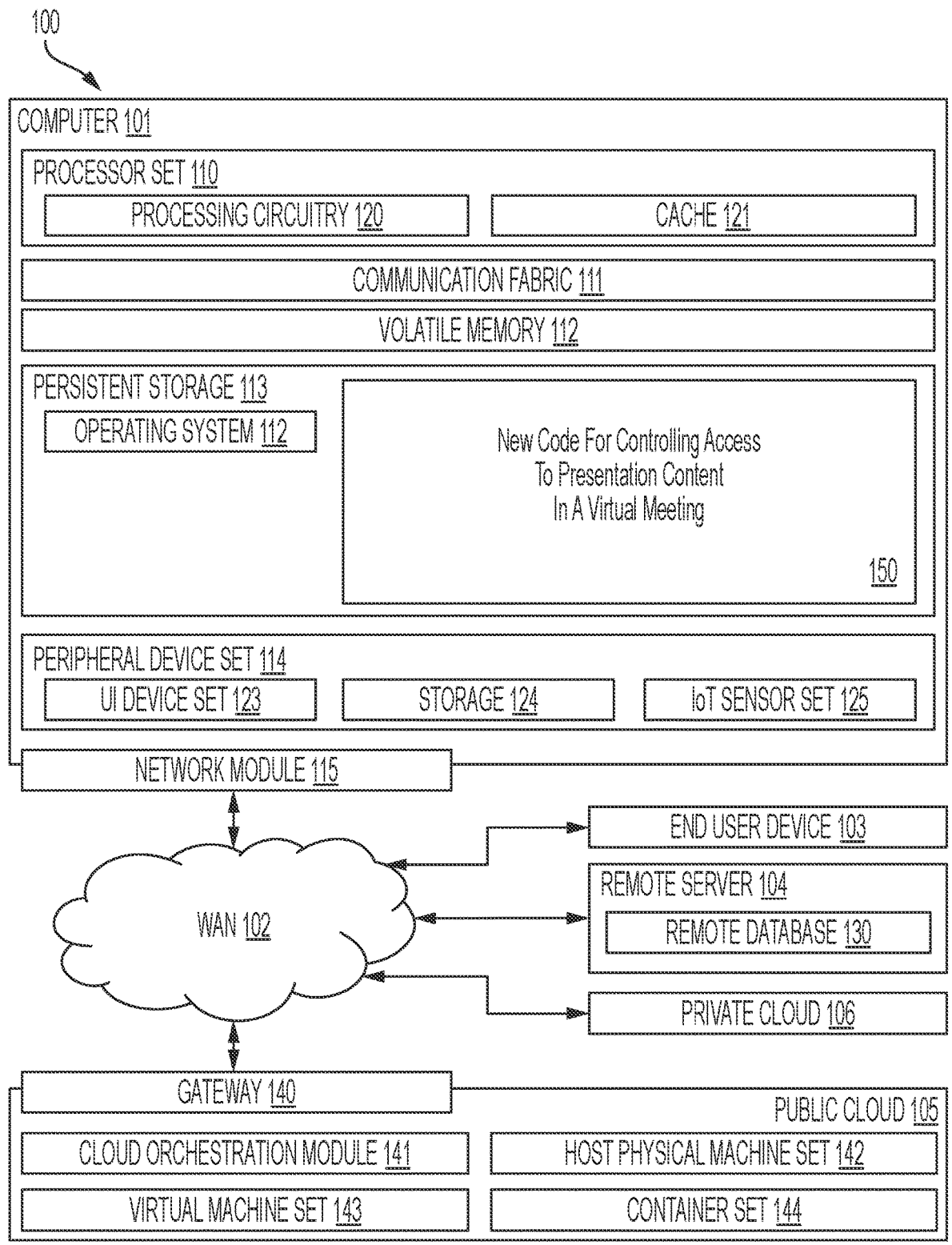
FIG. 7 depicts a computing environment containing an example of an environment for the execution of at least some of the computer code involved in performing the inventive methods, such as new code for controlling access to presentation content in a virtual meeting.

FIG. 7 depicts a computing environment 100 containing an example of an environment for the execution of at least some of the computer code involved in performing the inventive methods, such as new code for controlling access to presentation content in a virtual meeting 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for controlling access to presentation content to be presented to a plurality of participants in a virtual meeting, said method comprising:

receiving, by one or more processors, the presentation content, wherein the presentation content comprises restricted information pertaining to one topic and has a security level with respect to the one topic;

after said receiving the presentation content, identifying, by the one or more processors, one or more first participants of the plurality of participants in the virtual meeting who will be provided access to the presentation content during the virtual meeting and one or more second participants of the plurality of participants in the virtual meeting who will be denied access to one or more portions of the presentation content containing one or more portions of the restricted information during the virtual meeting, said identifying being based on access factors comprising: (i) a security level of the one topic and (ii) a security clearance level of each participant of the plurality of participants with respect to the one topic;

in response to said identifying the one or more first participants and the one or more second participants, providing, by the one or more processors, entry by the one or more first participants to a safe zone within the virtual meeting, wherein the presentation content is presented in the safe zone to the one or more first participants during the virtual meeting and the one or more portions of the presentation content containing the restricted information is denied to the one or more second participants during the virtual meeting, wherein the one or more first participants in the safe zone have full access to all content presented in the virtual meeting and not presented in any other safe zone within the virtual meeting, wherein one or more techniques are used to deny the one or more second participants access to the restricted information during the virtual meeting, and wherein the one or more techniques include (i) watermarking of the restricted information, (ii) shading of the restricted information, (iii) screen blurring to disable clarity of visibility of a display screen used to display the restricted information to one or more second participants, or (iv) combinations thereof.

2. The method of claim 1, said method further comprising:

during a period of time in which the one or more participants are in the safe zone, changing, by the one or more processors, the presentation content to presentable content that may be accessed by the one or more second participants; and presenting, by the one or more processors, the presentable content to the one or more second participants.

3. The method of claim 1, said method further comprising prior to said receiving the content:

receiving, by the one or more processors, topic-based information pertaining to a plurality of topics therein;

analyzing, by the one or more processors, the topic-based information to determine the topics in the topic-based information;

dividing, by the one or more processors, the topic-based information into a plurality portions, wherein each portion of the topic-based information independently pertains to only a single topic of the plurality of topics;

determining, by the one or more processors, that each one or more portions of the plurality of portions include restricted information pertaining to the single topic therein;

receiving, by the one or more processors, a designation of a single portion of the one or more portions of the topic-based information as the presentation content to be presented during the virtual meeting, wherein the restricted information pertaining to the one topic is the restricted information pertaining to the single topic.

4. The method of claim 1, wherein the access factors further comprise an audio and/or visual medium in which the one topic is presented in the virtual meeting.

5. The method of claim 1, wherein said receiving the presentation content comprises receiving the presentation content before the virtual meeting begins.

6. The method of claim 1, wherein said receiving the presentation content comprises receiving the presentation content during the virtual meeting, and wherein said identifying is performed in real time in a manner that is transparent to the plurality of participants.

7. The method of claim 1, wherein the one or more processors consist of an application specific integrated circuit (ASIC), and wherein electrical circuitry within the ASIC is hard wired to perform the method.

8. A computer program product, comprising one or more computer readable hardware storage devices having computer readable program code stored therein, said program code containing instructions executable by one or more processors of a computer system to implement a method for controlling access to presentation content to be presented to a plurality of participants in a virtual meeting, said method comprising:

receiving, by one or more processors, the presentation content, wherein the presentation content comprises restricted information pertaining to one topic and has a security level with respect to the one topic;

after said receiving the presentation content, identifying, by the one or more processors, one or more first participants of the plurality of participants in the virtual meeting who will be provided access to the presentation content during the virtual meeting and one or more second participants of the plurality of participants in the virtual meeting who will be denied access to one or more portions of the presentation content containing one or more portions of the restricted information during the virtual meeting, said identifying being based on access factors comprising: (i) a security level of the one topic and (ii) a security clearance level of each participant of the plurality of participants with respect to the one topic;

in response to said identifying the one or more first participants and the one or more second participants, providing, by the one or more processors, entry by the one or more first participants to a safe zone within the virtual meeting, wherein the presentation content is presented in the safe zone to the one or more first participants during the virtual meeting and the one or more portions of the presentation content containing the restricted information is denied to the one or more second participants during the virtual meeting, wherein the one or more first participants in the safe zone have full access to all content presented in the virtual meeting and not presented in any other safe zone within the virtual meeting, wherein one or more techniques are used to deny the one or more second participants, wherein one or more techniques are used to deny the one or more second participants access to the restricted information during the virtual meeting, and wherein the one or more techniques include (i) watermarking of the restricted information, (ii) shading of the restricted information, (iii) screen blurring to disable clarity of visibility of a display screen used to display the restricted information to one or more second participants, or (iv) combinations thereof.

9. The computer program product of claim 8, said method further comprising:
during a period of time in which the one or more participants are in the safe zone, changing, by the one or more processors, the presentation content to presentable content that may be accessed by the one or more second participants; and
presenting, by the one or more processors, the presentable content to the one or more second participants.

10. The computer program product of claim 8, said method further comprising prior to said receiving the content:
receiving, by the one or more processors, topic-based information pertaining to a plurality of topics therein;
analyzing, by the one or more processors, the topic-based information to determine the topics in the topic-based information;
dividing, by the one or more processors, the topic-based information into a plurality portions, wherein each portion of the topic-based information independently pertains to only a single topic of the plurality of topics;
determining, by the one or more processors, that each one or more portions of the plurality of portions include restricted information pertaining to the single topic therein;
receiving, by the one or more processors, a designation of a single portion of the one or more portions of the topic-based information as the presentation content to be presented during the virtual meeting, wherein the restricted information pertaining to the one topic is the restricted information pertaining to the single topic.

11. The computer program product of claim 8, wherein the access factors further comprise an audio and/or visual medium in which the one topic is presented in the virtual meeting.

12. The computer program product of claim 8, wherein said receiving the presentation content comprises receiving the presentation content before the virtual meeting begins.

13. The computer program product of claim 8, wherein said receiving the presentation content comprises receiving the presentation content during the virtual meeting, and wherein said identifying is performed in real time in a manner that is transparent to the plurality of participants.

14. A computer system, comprising one or more processors, one or more memories, and one or more computer readable hardware storage devices, said one or more hardware storage devices containing program code executable by the one or more processors via the one or more memories to implement a method for controlling access to presentation content to be presented to a plurality of participants in a virtual meeting, said method comprising:
receiving, by one or more processors, the presentation content, wherein the presentation content comprises restricted information pertaining to one topic and has a security level with respect to the one topic;
after said receiving the presentation content, identifying, by the one or more processors, one or more first participants of the plurality of participants in the virtual meeting who will be provided access to the presentation content during the virtual meeting and one or more second participants of the plurality of participants in the virtual meeting who will be denied access to one or more portions of the presentation content containing one or more portions of the restricted information during the virtual meeting, said identifying being based on access factors comprising: (i) a security level of the one topic and (ii) a security clearance level of each participant of the plurality of participants with respect to the one topic;
in response to said identifying the one or more first participants and the one or more second participants, providing, by the one or more processors, entry by the one or more first participants to a safe zone within the virtual meeting, wherein the presentation content is presented in the safe zone to the one or more first participants during the virtual meeting and the one or more portions of the presentation content containing the restricted information is denied to the one or more second participants during the virtual meeting, wherein the one or more first participants in the safe zone have full access to all content presented in the virtual meeting and not presented in any other safe zone within the virtual meeting, wherein one or more techniques are used to deny the one or more second participants access to the restricted information during the virtual meeting, and wherein the one or more techniques include (i) watermarking of the restricted information, (ii) shading of the restricted information, (iii) screen blurring to disable clarity of visibility of a display screen used to display the restricted information to one or more second participants, or (iv) combinations thereof.

15. The computer system of claim 14, said method further comprising:
during a period of time in which the one or more participants are in the safe zone, changing, by the one or more processors, the presentation content to presentable content that may be accessed by the one or more second participants; and
presenting, by the one or more processors, the presentable content to the one or more second participants.

16. The computer system of claim 14, said method further comprising prior to said receiving the content:
receiving, by the one or more processors, topic-based information pertaining to a plurality of topics therein;
analyzing, by the one or more processors, the topic-based information to determine the topics in the topic-based information;
dividing, by the one or more processors, the topic-based information into a plurality portions, wherein each portion of the topic-based information independently pertains to only a single topic of the plurality of topics;
determining, by the one or more processors, that each one or more portions of the plurality of portions include restricted information pertaining to the single topic therein;
receiving, by the one or more processors, a designation of a single portion of the one or more portions of the topic-based information as the presentation content to be presented during the virtual meeting, wherein the restricted information pertaining to the one topic is the restricted information pertaining to the single topic.

17. The computer system of claim 14, wherein the access factors further comprise an audio and/or visual medium in which the one topic is presented in the virtual meeting.

18. The computer system of claim 14, wherein said receiving the presentation content comprises receiving the presentation content before the virtual meeting begins.

19. The computer system of claim 14, wherein said receiving the presentation content comprises receiving the presentation content during the virtual meeting, and wherein said identifying is performed in real time in a manner that is transparent to the plurality of participants.

20. The computer system of claim 14, wherein the one or more processors consist of an application specific integrated circuit (ASIC), and wherein electrical circuitry within the ASIC is hard wired to perform the method.

\* \* \* \* \*